(12) United States Patent
Fan et al.

(10) Patent No.: US 10,162,204 B2
(45) Date of Patent: Dec. 25, 2018

(54) DISPLAY WITH TELESCOPIC MEMBER

(71) Applicant: Shenzhen China Star Optoelectronics Technology Co., Ltd., Shenzhen, Guangdong (CN)

(72) Inventors: Yong Fan, Guangdong (CN); Yu-chun Hsiao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 192 days.

(21) Appl. No.: 15/038,482

(22) PCT Filed: Apr. 25, 2016

(86) PCT No.: PCT/CN2016/080148
§ 371 (c)(1),
(2) Date: May 23, 2016

(87) PCT Pub. No.: WO2017/173678
PCT Pub. Date: Oct. 12, 2017

(65) Prior Publication Data
US 2018/0081230 A1   Mar. 22, 2018

(30) Foreign Application Priority Data
Apr. 7, 2016 (CN) .......................... 2016 1 0213663 0

(51) Int. Cl.
*G02F 1/1333* (2006.01)
*F21V 8/00* (2006.01)
*G09F 9/302* (2006.01)

(52) U.S. Cl.
CPC ..... *G02F 1/133308* (2013.01); *G02B 6/0043* (2013.01); *G02B 6/0055* (2013.01);
(Continued)

(58) Field of Classification Search
CPC ... G02F 1/133308; G02F 2001/133342; G02B 6/0063; G02B 6/0043; G02B 6/0088; G02B 6/0055; G09F 9/3026
See application file for complete search history.

(56) References Cited

U.S. PATENT DOCUMENTS 9,696,760 B1 * 7/2017 Zhang .................. G06F 1/1652
2005/0099793 A1   5/2005 Ogawa et al.
(Continued)

FOREIGN PATENT DOCUMENTS

CN        1547061 A      11/2004
CN      101936447 A       1/2011
(Continued)

OTHER PUBLICATIONS

CN202587191U Machine English Translation dated Dec. 5, 2012.*

*Primary Examiner* — Karabi Guharay
*Assistant Examiner* — Glenn Zimmerman
(74) *Attorney, Agent, or Firm* — Andrew C. Cheng (57) ABSTRACT

The present disclosure proposes a display. The display includes a first display panel, a second display panel, and a connecting mechanism, connecting the first display panel and the second display panel, for adjusting relative positions of the first display panel and the second display panel. By means of the connecting mechanism, relative positions of the first display panel and the second display panel are adjustable. Therefore, the display can be applied to a plurality of scenarios and saves material cost.

12 Claims, 6 Drawing Sheets

(52) U.S. Cl.
CPC ......... *G02B 6/0063* (2013.01); *G02B 6/0088* (2013.01); *G09F 9/3026* (2013.01); *G02F 2001/133342* (2013.01)

(56) References Cited

U.S. PATENT DOCUMENTS

| | | | |
|---|---|---|---|
| 2006/0028844 A1* | 2/2006 | Parker | A61M 21/02 362/613 |
| 2011/0038109 A1 | 2/2011 | Hwang et al. | |
| 2011/0116000 A1 | 5/2011 | Dunn et al. | |

FOREIGN PATENT DOCUMENTS

| | | |
|---|---|---|
| CN | 102332230 A | 1/2012 |
| CN | 202587191 U | 12/2012 |
| CN | 103398275 A | 11/2013 |
| CN | 203631074 U | 6/2014 |
| CN | 203927286 U | 11/2014 |
| CN | 105405361 A | 3/2016 |

* cited by examiner

DISPLAY WITH TELESCOPIC MEMBER

BACKGROUND OF THE INVENTION

1. Field of the Invention

The present invention relates to display technology, and more specifically, to a double-sided display.

2. Description of the Prior Art

Double-sided display is currently widely applied in the field of commercial display. However, the basic structure of the existing doubled-sided display is mainly composed of two independent liquid crystal modules on a fixed back plate structure. This structure of double-sided display can only be applied to several specific scenarios. It cannot be applied to a variety of different scenarios, and its material cost is high.

SUMMARY OF THE INVENTION

An objective of the present invention is to provide a display which can be applied to a plurality of scenarios and saves material cost.

According to the present invention, a display comprises a first display panel, a second display panel, and a connecting mechanism connecting the first display panel and the second display panel. The connecting mechanism comprises a base and a distance adjusting member. A first end of the first display panel and a first end of the second display panel are disposed on the base relatively, capable of rotating to opposite directions around the base. A distance between the first display panel and the second display panel is adjustable with the distance adjusting member, so that relative positions of the first display panel and the second display panel are adjustable. An angle between the first display panel and the second display panel is between 0° to 60°.

Furthermore, the distance adjusting member comprises a sliding track and a fastener. A second end of the first display panel and a second end of the second display panel is fixed at different positions on the sliding track in a movable manner, and fastened to the sliding track by the fastener.

Furthermore, the distance adjusting member comprises a telescopic member, with the second ends of the first display panel and the second display panel fixed on two ends of the telescopic member respectively.

Furthermore, the distance adjusting member further comprises a driving device, which connects to the telescopic member and drives the telescopic members to extend or shorten.

Furthermore, the display further comprises a double-sided backlight module. Light emitted from the two sides travel toward the first display panel and the second display panel, respectively. An end of the double-sided backlight module is relatively fixed on the base, and another end is relatively fixed on the distance adjusting member.

Furthermore, a side of the connecting mechanism facing the double-sided backlight module is attached with a reflective film.

Furthermore, the double-sided backlight module comprises a light guide plate, a light source disposed on either side or both sides of the light guide plate, and optical films disposed on both sides of the light guide plate.

Furthermore, a plurality of dot structures are disposed on either one side or both sides of the light guide plate.

According to the present invention, a display comprises a first display panel, a second display panel, and a connecting mechanism connecting the first display panel and the second display panel, for adjusting relative positions of the first display panel and the second display panel.

Furthermore, the connecting mechanism comprises a base and a distance adjusting member. A first end of the first display panel and a first end of the second display panel are disposed on the base relatively, capable of rotating to opposite directions around the base. Since a distance between the first display panel and the second display panel is adjustable with the distance adjusting member, relative positions of the first display panel and the second display panel are adjustable.

Furthermore, the distance adjusting member comprises a sliding track and a fastener; a second end of the first display panel and a second end of the second display panel is fixed at different positions on the sliding track in a movable manner, and fastened to the sliding track by the fastener.

Furthermore, the distance adjusting member comprises a telescopic member, with the second ends of the first display panel and the second display panel fixed on two ends of the telescopic member respectively.

Furthermore, the distance adjusting member further comprises a driving device, which connects to the telescopic member and drives the telescopic members to extend or shorten.

Furthermore, the display further comprises a double-sided backlight module. Light emitted from the two sides travel toward the first display panel and the second display panel, respectively. An end of the double-sided backlight module is relatively fixed on the base, and another end is relatively fixed on the distance adjusting member.

Furthermore, a side of the connecting mechanism facing the double-sided backlight module is attached with a reflective film.

Furthermore, the double-sided backlight module comprises a light guide plate, a light source disposed on either side or both sides of the light guide plate, and optical films disposed on both sides of the light guide plate.

Furthermore, a plurality of dot structures are disposed on either one side or both sides of the light guide plate.

Furthermore, an angle between the first display panel and the second display panel is between 0° to 60°.

In contrast to prior art, the present invention connects a first display panel and a second display panel through installing a connecting mechanism, so that the relative positions of the first display panel and the second display panel are adjustable. Thus, the display can be applied to a plurality of scenarios and saves material cost.

DETAILED DESCRIPTION OF PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

The present invention provides a display to fix the flaws mentioned in the prior art. The following text provides a more elaborated description on the present invention with figures and embodiments.

Figure 1:
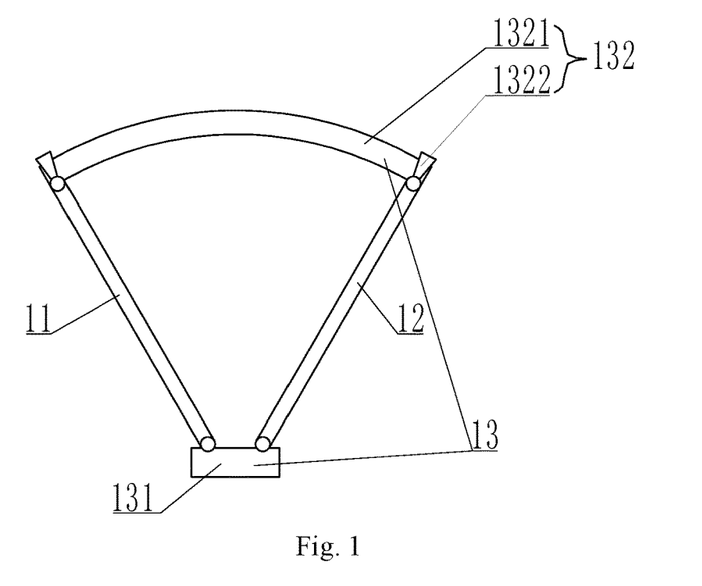
FIG. 1 is a schematic diagram of a first embodiment of the present invention.

Please refer to FIG. 1. FIG. 1 is a schematic diagram of a first embodiment of the present invention. A display comprises at least a first display panel 11, a second display panel 12 and a connecting mechanism 13.

The connecting mechanism 13 connects the first display panel 11 and the second display panel 12. The relative positions of the first display panel 11 and the second display panel 12 are adjustable.

The display panel can be a liquid crystal display (LCD) panel or an organic light-emitting diode (OLED) display panel.

The connecting mechanism 13 comprises a base 131 and a distance adjusting member 132.

A first end of the first display panel 11 and a first end of the second display panel 12 are disposed relatively on the base 131, rendering the two panels capable of rotating to opposite directions around the base 131. A second end of the first display panel 11 and a second end of the second display panel 12 are connected to the distance adjusting member 132. With the distance adjusting member 132, the distance between the second ends of the first display panel 11 and the second display panel 12 are adjustable, rendering the relative positions of the first display panel 11 and second display panel 12 adjustable.

The first ends of the first display panel 11 and the second display panel 12 can be hinged to the base 131.

The distance adjusting member 132 comprises a sliding track 1321 and a fastener 1322.

Figure 2:
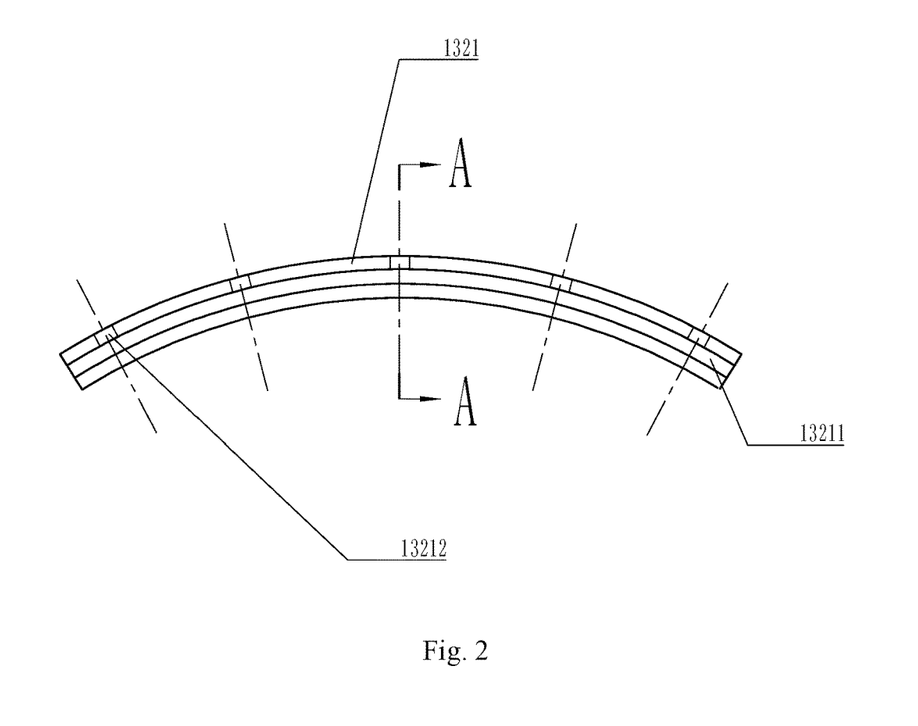
FIG. 2 is a schematic diagram of the sliding track.
Figure 3:
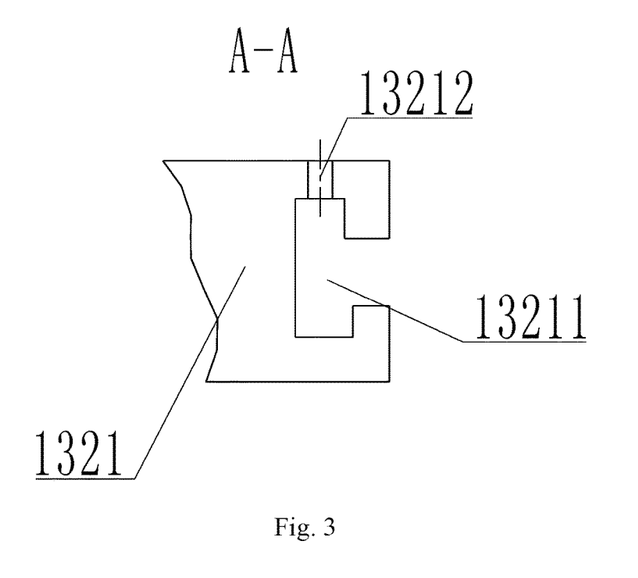
FIG. 3 is a cross-sectional view taken along line A-A.

Please refer to FIG. 2 and FIG. 3. FIG. 2 is a schematic diagram of the sliding track 1321. FIG. 3 is a cross-sectional view taken along line A-A. The sliding track 1321 is an arc with a sliding ditch 13211, and a plurality of locking holes 13212 that the fastener 1322 can fasten to.

The second ends of the first display panel 11 and the second display panel 12 can be fixed at different positions on the sliding track 1321 in a movable manner, and fastened to the sliding track 1321 by the fastener 1322.

Figure 4:
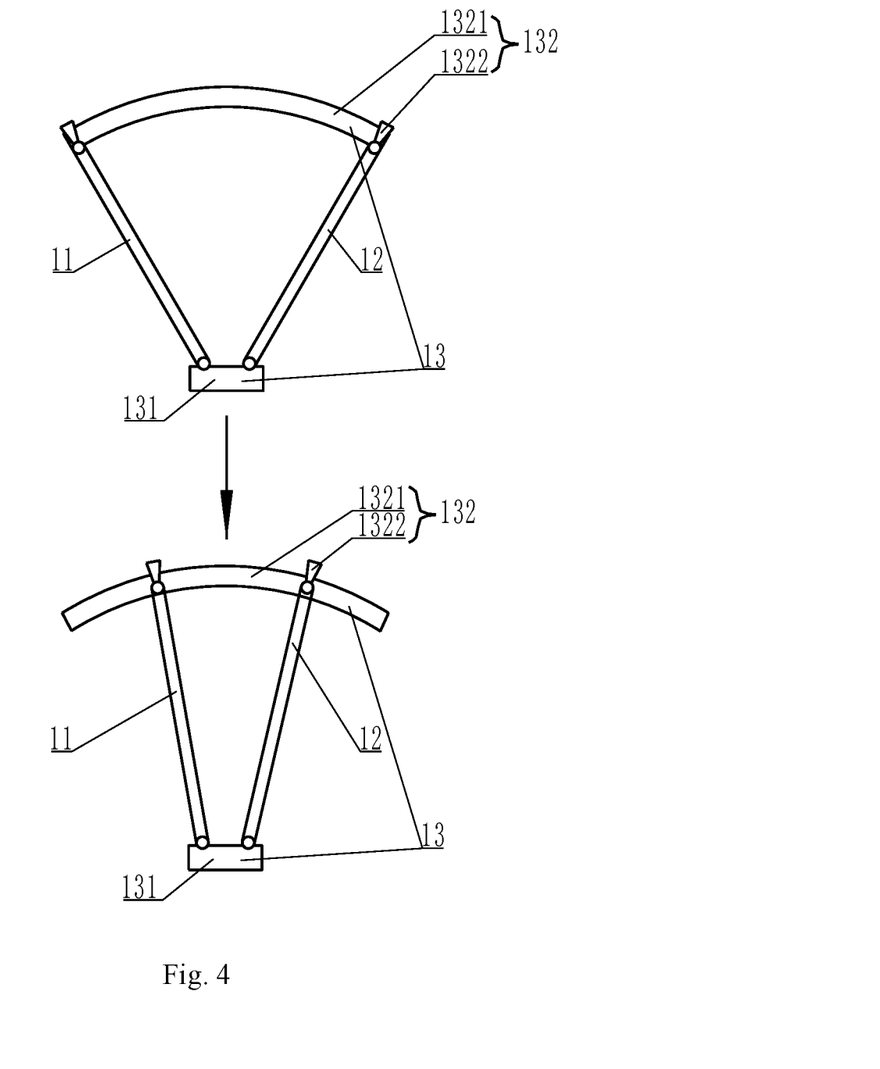
FIG. 4 is a schematic diagram showing the display before and after adjusting for different scenarios of the first embodiment of the present invention.

Please refer to FIG. 4. FIG. 4 is a schematic diagram showing the display before and after adjusting for different scenarios of the first embodiment of the present invention. When the position of the display panel needs to be adjusted, the fastener 1322 should be loosened first, and then adjust an angle of the first display panel 11 or the second display panel 12 to a suitable position, and fasten the fastener 1322 again, so that the first display panel 11 or the second display panel 12 is fixed at a suitable position.

The present embodiment connects the first and second display panels with the connecting mechanism and applies the sliding track and fastener so that the relative positions of the first and second display panels are adjustable. The display thus can be applied to a plurality of scenarios and saves material cost.

Figure 5:
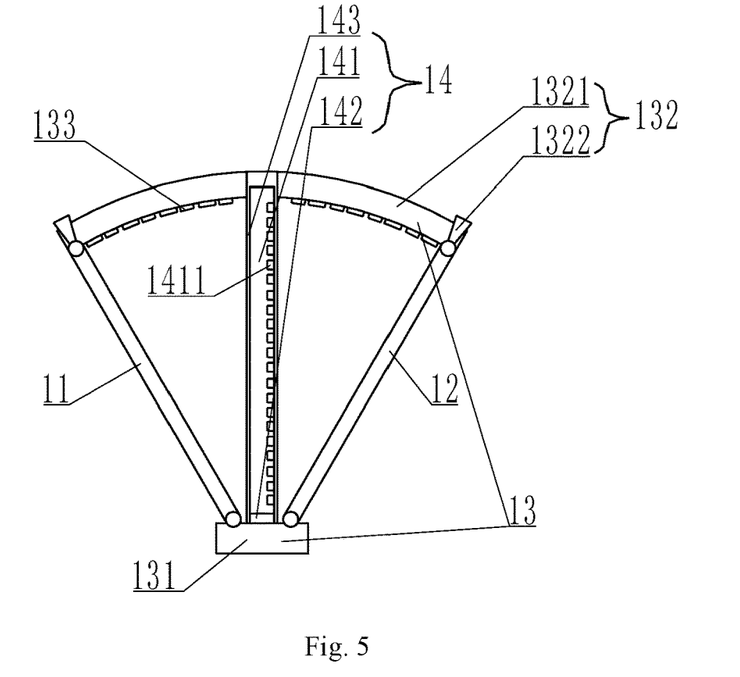
FIG. 5 is a schematic diagram of a display according to a second embodiment of the present invention.

Please refer to FIG. 5. FIG. 5 is a schematic diagram of a display according to a second embodiment of the present invention. In the second embodiment, the display comprises a double-sided backlight module 14. The light emitted from the two sides of the module goes into a first display panel 11 and a second display panel 12 respectively. In the preferred embodiment, the display panels can be transmissive LCD panels. An end of the double-sided backlight module 14 is fixed to a base 131 relatively, whereas the other end is fixed to a distance adjusting member 132 relatively. The way of fixing can be gluing or fastening by a fastener.

A side of a connecting mechanism 13 facing the double-sided backlight module 14 is attached with a reflective film 133. More specifically, a side of the sliding track 1321 facing the double-sided backlight module 14 is attached with a reflective film 133.

The backlight module 14 comprises a light guide plate 141, a light source 142 disposed at either one end or both ends of the light guide plate 141 (i.e. making it an edge-lit panel), and optical films 143 disposed on both sides of the light guide plate. The light source 142 can be a LED light source.

At least one side of the light guide plate 141 is overlaid with a dot structures 1411.

Preferably, a relative angle between the first display panel 11 and the second display panel 12 is between 0° to 60°. Of course, it can be between 0° to 150°.

In another alternative embodiment of the second embodiment of the present invention, the distance adjusting member can comprise a slideway with gears. Correspondingly, a driving device comprising gears and drive gears that moves in the slideway with gears can be disposed at the second ends of the first display panel and the second display panel. The driving device can be a combination of a servo motor or a stepper motor with a driver.

In another alternative embodiment of the second embodiment of the present invention, the doubled-sided backlight module 14 of the display device can be a direct-lit or edge-lit backlight module.

Figure 6:
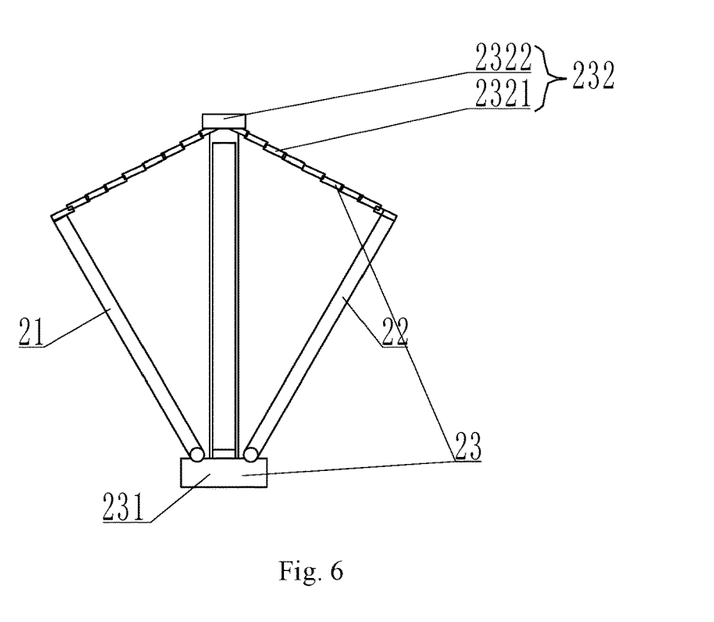
FIG. 6 is a schematic diagram of a display according to a third embodiment of the present invention.

Please refer to FIG. 6. FIG. 6 is a schematic diagram of a display according to a third embodiment of the present invention. The embodiment comprises at least a first display panel 21, a second display panel 22 and a connecting mechanism 23.

The connecting mechanism 23 connects the first display panel 21, the second display panel 22, rendering the relative positions of the first display panel 21 and the second display panel 22 adjustable.

The display panel can be a LCD panel or OLED display panel.

The connecting mechanism 23 comprises a base 231 and a distance adjusting member 232.

A first end of the first display panel 21 and a first end of the second display panel 22 are disposed on the base 231 relatively, rendering the two panels capable of rotating to opposite directions around the base 231. A second end of the first display panel 21 and a second end of the second display panel 22 connect to the distance adjusting member 232. With the distance adjusting member 232, the distance between the second ends of the first display panel 21 and the second display panel 22 is adjustable, thus the relative positions of the first display panel 21 and the second display panel 22 are adjustable.

The first ends of the first display panel 21 and the second display panel 22 can be hinged to the base 231.

The distance adjusting member 232 comprises a telescopic member 2321. The second ends of the first display panel 21 and the second display panel 22 are fixed to the two ends of the telescopic member 2321 respectively.

The distance adjusting member 232 further comprises a driving device 2322.

The driving device 2322 connects and drives the telescopic member 2321 to extend or shorten.

The driving device 2322 can be a combination of a servo motor or a stepper motor with a driver.

Figure 7:
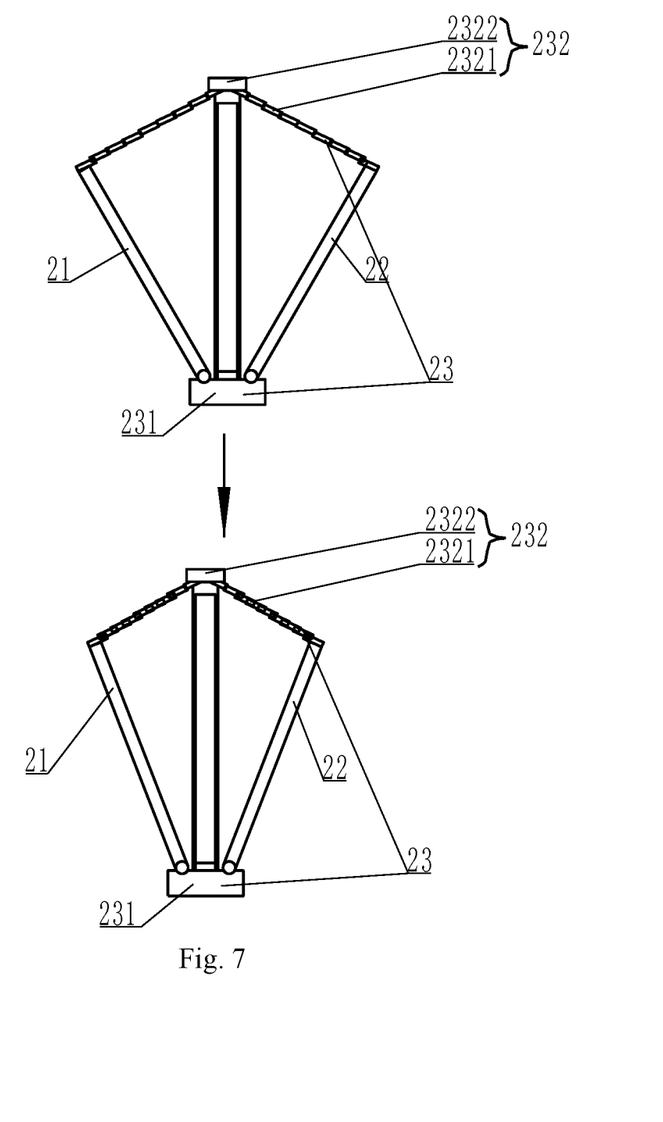
FIG. 7 is a schematic diagram showing the display before and after adjusting for different scenarios of the third embodiment of the present invention.

Please refer to FIG. 7. FIG. 7 is a schematic diagram showing the display before and after adjusting for different scenarios of the third embodiment of the present invention. When the position of the display panels needs to be adjusted, the adjustment can be done through manually pulling or pushing the display panels to the suitable positions. When the display is placed or hung in a position that is not suitable for manual adjustment, the adjustment can be done through the extension or shortening of the telescopic member 2321 driven by the driving device 2322, so that the first display panel 21 or the second display panel 22 is fixed at a suitable position.

The present embodiment connects the first and second display panels with the connecting mechanism and adjusts the distance between the first and second display panels by applying the telescopic member and driving device, so that the relative positions of the first display panel and the second display panel are adjustable. The display can be applied to a plurality of scenarios and saves material cost.

Figure 8:
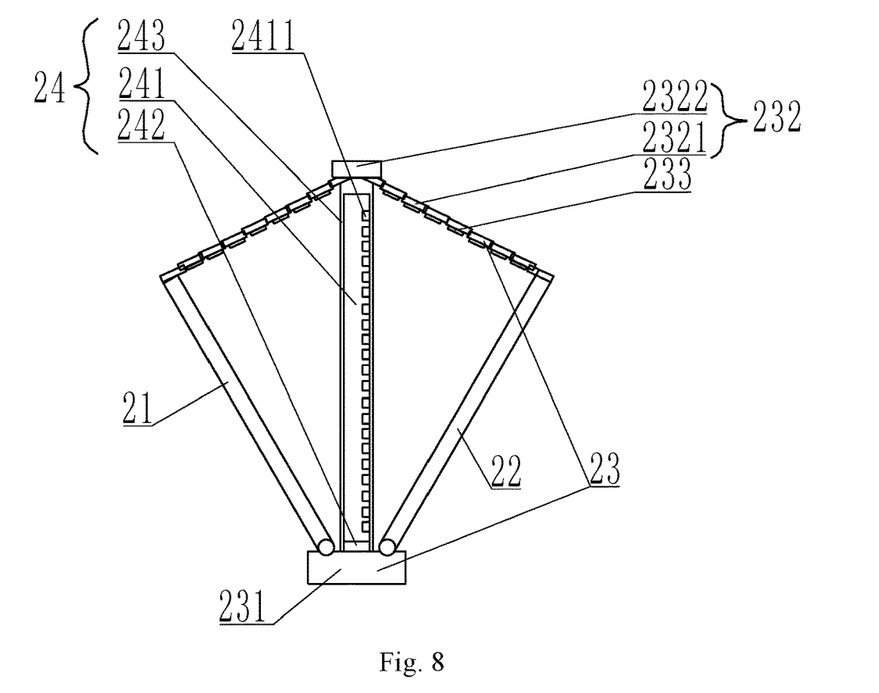
FIG. 8 is a schematic diagram of a display according to a fourth embodiment of the present invention.

Please refer to FIG. 8. FIG. 8 is a schematic diagram of a display according to a fourth embodiment of the present invention. The display comprises a double-sided backlight module 24. The light emitted from the two sides of the module goes into a first display panel 21 and a second display panel 22 respectively. In the preferred embodiment, the display panels can be transmissive LCD panels. An end of the double-sided backlight module 24 is fixed to a base 231 relatively, whereas the other end is fixed to a distance adjusting member 232 relatively. The way of fixing can be gluing or fastening by a fastener.

A side of a connecting mechanism 23 facing the double-sided backlight module 24 is attached with a reflective film 233. More specifically, a side of a telescopic member 2321 facing the double-sided backlight module 24 is attached with a reflective film 233.

The backlight module 24 comprises a light guide plate 241, a light source 242 disposed at either one end or both ends of the light guide plate 241 (i.e. making it an edge-lit panel), and optical films 243 disposed on both sides of the light guide plate. The light source 242 can be a LED light source.

At least one side of the light guide place 241 is overlaid with dot structures 2411.

Preferably, the relative angle between the first display panel 21 and the second display panel 22 is between 0° to 60°. Of course, it can be between 0° to 150°.

In another alternative embodiment of the fourth embodiment of the display of the present invention, the doubled-sided backlight module 24 of the display can be a direct-lit or edge-lit backlight module.

Figure 9:
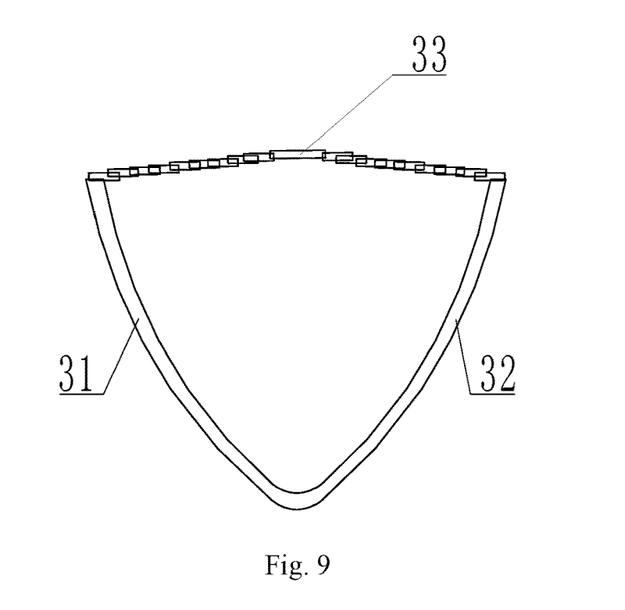
FIG. 9 is a schematic diagram of a display according to a fifth embodiment of the present invention.

Please refer to FIG. 9. FIG. 9 is a schematic diagram of a display according to a fifth embodiment of the present invention. The present embodiment comprises at least a first display panel 31, a second display panel 32 and a connecting mechanism 33.

The connecting mechanism 33 connects the first display panel 31 and the second display panel 32, so that the relative positions of the first display panel 31 and the second display panel 32 is adjustable.

The display panels can be OLED display panels. The first display panel 31 and the second display panel 32 are formed by bending the same OLED display panel. The two panels show the same or different content respectively.

A second end of the first display panel 31 and a second end of the second display panel 32 are connected by the connecting mechanism 33. With the connecting mechanism 33, the relative distance between the first panel 31 and the second panel 32 is adjustable, thus the relative positions between the first display panel 31 and the second display panel 32 are adjustable.

The present embodiment connects the first and second display panels with the connecting mechanism, and adjusts the distance between the first and the second display panels, so that the relative positions of the first and second display panels are adjustable. The display can be applied to a plurality of scenarios and saves material cost.

The present embodiment can be combined with the first or second embodiment of the display of the present invention.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. A display, comprising:
   a first display panel;
   a second display panel; and
   a connecting mechanism, connecting the first display panel and the second display panel, and comprising a base and a distance adjusting member;
   wherein a first end of the first display panel and a first end of the second display panel are disposed on the base relatively, capable of rotating to opposite directions around the base; a distance between the first display panel and the second display panel is adjustable with the distance adjusting member, so that relative positions of the first display panel and the second display panel are adjustable;
   wherein an angle between the first display panel and the second display panel is between 0° to 60°; and
   wherein the distance adjusting member comprises a telescopic member, with the second ends of the first display panel and the second display panel fixed on two ends of the telescopic member respectively.

2. The display of claim 1 wherein the distance adjusting member further comprises a driving device, which connects to the telescopic member and drives the telescopic members to extend or shorten.

3. The display of claim 1 further comprising: a double-sided backlight module, wherein light emitted from the two sides travel toward the first display panel and the second display panel, respectively; an end of the double-sided backlight module is relatively fixed on the base, and another end is relatively fixed on the distance adjusting member.

4. The display of claim 3, wherein a side of the connecting mechanism facing the double-sided backlight module is attached with a reflective film.

5. The display of claim 3, wherein the double-sided backlight module comprises a light guide plate, a light source disposed on either side or both sides of the light guide plate, and optical films disposed on both sides of the light guide plate.

6. The display of claim 5, wherein a plurality of dot structures are disposed on either one side or both sides of the light guide plate.

7. A display, comprising:
a first display panel;
a second display panel; and
a connecting mechanism, connecting the first display panel and the second display panel, for adjusting relative positions of the first display panel and the second display panel;
wherein the connecting mechanism comprises a base and a distance adjusting member;
a first end of the first display panel and a first end of the second display panel disposed on the base relatively, capable of rotating to opposite directions around the base; a distance between the first display panel and the second display panel is adjustable with the distance adjusting member, so that relative positions of the first display panel and the second display panel are adjustable; and
wherein the distance adjusting member comprises a telescopic member, with the second ends of the first display panel and the second display panel fixed on two ends of the telescopic member respectively.

8. The display of claim 7, wherein the distance adjusting member further comprises a driving device, which connects to the telescopic member and drives the telescopic members to extend or shorten.

9. The display of claim 7 further comprising: a double-sided backlight module, wherein light emitted from the two sides travel toward the first display panel and the second display panel, respectively; an end of the double-sided backlight module is relatively fixed on the base, and another end is relatively fixed on the distance adjusting member.

10. The display of claim 9, wherein a side of the connecting mechanism facing the double-sided backlight module is attached with a reflective film.

11. The display of claim 9, wherein the double-sided backlight module comprises a light guide plate, a light source disposed on either side or both sides of the light guide plate, and optical films disposed on both sides of the light guide plate.

12. The display of claim 11, wherein a plurality of dot structures are disposed on either one side or both sides of the light guide plate.

* * * * *